Patented Dec. 22, 1931

1,837,305

UNITED STATES PATENT OFFICE

EDWARD H. WIGHT, WILLIAM H. WAGGAMAN, AND BEVERLY OBER, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING PHOSPHATIC FERTILIZER

No Drawing. Application filed October 19, 1927. Serial No. 227,356.

This invention relates to the production of fertilizers and more particularly to a process for manufacturing phosphatic fertilizers.

In manufacturing superphosphates it is the practice to mix a batch of ground phosphate rock with approximately an equal weight of sulphuric acid. These materials are allowed to interact with the formation of available calcium phosphate salts and calcium sulphate. The reactive ingredients are mixed, as thoroughly as conditions will permit and, while still in a semi-liquid mass, are dumped into a den. In this element the reactions continue with the ultimate formation of solid end products. Due to the formation of these products and the evolution of gases, the mass sets up as a damp porous material. In this condition it contains free acid and an undesirable quantity of water. To eliminate the free acid the product is dusted with absorbents and it is thereafter deposited in a storage shed and allowed to remain until dried to the desired degree.

In actual practice, excess of acid over the theoretical quantity required to convert the tricalcium phosphate into monocalcium phosphate is added. This is necessitated by the fact that the sulphuric acid attacks certain impurities in the rock and hence a considerable amount of the reagent is consumed. The quantity actually added is approximately that which is sufficient to acidulate tricalcium phosphate and to react with the impurities in the raw materials.

The acid employed in the process is chamber acid. As is known, this ranges in concentration from approximately 50° Baumé to about 55° Baumé. Higher concentrations are not used for the reason that water must be supplied to hydrate the major products, that is to say monocalcium phosphate and calcium sulphate. This water of hydration is made available by utilizing a weaker acid, the water diluent being subsequently taken up, in part, as water of hydration. Most manufacturers have found that 52° Baumé acid is the desirable concentration, and the use of this strength of acid is prevalent throughout the industry.

It is an object of this invention to provide a reagent for use in the manufacture of phosphatic fertilizers which has great acidulating power.

Another object is to provide an acidulating agent for use in fertilizer manufacture which possesses a very high degree of miscibility with phosphatic material.

Yet another object is to provide a process for manufacturing phosphatic fertilizers in which the reagent employed has a selective action on components of the phosphatic raw material.

A further object of this invention is to provide a process for manufacturing phosphatic fertilizers to produce a product which has increased availability.

A still further object is to reduce the cost in phosphatic fertilizer production by utilizing a reagent which has higher acidulating value and which is cheaper than those heretofore used.

With these and other equally important objects in view our invention comprehends the treatment of phosphatic raw material with a reagent, which is less viscous and which has greater acidulating value than those in use, to produce a product having a very high availability.

As has been indicated hereinbefore a considerable amount of the acid added to ground phosphate rock is consumed in reaction with impurities. Since these side products eventuate in products which have no fertilization value such acid consumption represents an absolute loss.

We have discovered a reagent which will effectively acidulate tricalcium phosphate while attacking certain of the impurities only slightly.

This selective action, which will be disclosed more fully, is of extreme importance since it decreases the consumption of the expensive acid ingredient. We have found, in addition, that this reagent has greater acidulating value and furthermore has a higher penetrative power than the acids customarily employed.

We have ascertained that 41° Baumé sulphuric acid will mix readily with ground phosphatic material and will acidulate it to a remarkable degree. This acid furthermore has less affinity for the fluoride impurities.

The increased penetrative value of 41° Baumé acid over those of greater concentration we suggest is attributable to two causes. Since a thin acid is less viscous or dense than those of higher strengths it possesses a greater fluidity and penetrative power. This factor is of paramount importance in the manufacture of phosphate fertilizer since, as is known, it is extremely difficult to obtain an intimate mixture of the rock and acid. This difficulty is due primarily to the rapidity of reaction and the rapid "set-up". A more fluid acidifying agent insures greater intimacy of contact.

A second factor which we believe contributable to the increased penetrative value of 41° Baumé acid is its immediate vigorous action on the carbonate impurities. When sulphuric acid reacts with the carbonate, carbon dioxide is evolved. As this gas percolates upwardly through the heavy sludge it, in effect, agitates the mix and thereby promotes a thorough incorporation of the rock in the acid.

Our experiments have shown that 41° Bé. acid has a critical value in acidulating phosphate rock. It appears to be the optimum concentration for this work since it possesses greater acidulating value than stronger as well as the weaker acids. The following table clearly brings out this striking characteristic. In the experiments represented by this table rock dust in the amount indicated was treated with varying strengths of sulphuric acid in sealed tubes at elevated temperature. The temperature and pressure were kept constant for each run. After conversion of the rock the material was removed and dried.

The materials after removal from tubes were dried in the same way.

I

| Sample | Strength of acid Bé. | Ratio of dust/acid | Temp. in cent. | % insol. P₂O₅ | % acidulation |
|---|---|---|---|---|---|
| (1) | 30 | 100/75 | 135 | 3.74 | 79.1 |
| (2) | 35 | 100/75 | 135 | 3.84 | 78.5 |
| (3) | 37 | 100/75 | 135 | 3.94 | 78.5 |
| (4) | 40 | 100/75 | 135 | 3.74 | 77.7 |
| (5) | 41 | 100/75 | 135 | 2.88 | 83.5 |
| (6) | 42 | 100/75 | 135 | 3.45 | 80.3 |
| (7) | 43 | 100/75 | 135 | 3.17 | 81.7 |
| (8) | 44½ | 100/75 | 135 | 4.0 | 78.5 |
| (9) | 47½ | 100/75 | 135 | 4.14 | 78.3 |
| (10) | 49 | 100/75 | 135 | 4.5 | 75.8 |
| (11) | 50 | 100/75 | 135 | 5.0 | 74.7 |
| (12) | 52 | 100/75 | 135 | 5.5 | 72 |

From the above table it is clearly manifest that 41° Bé. acid possesses greater acidulating value than other concentrations. The efficiency of this concentration as compared to 52° Bé. is striking. In the treatment of a given sample under identical conditions the 41° Bé. acid gave 11.5% more acidulation of the phosphate content.

Our experiments have proved that this advantage of the weaker acid does not depend upon critical conditions of the mix but obtains for the varying conditions of temperature to which a reactive mass of acid and rock may be raised. The following table indicates the relative acidulating powers of different strengths of acid at a considerably lower temperature than that which obtained for the treatment noted under Table I.

II

| Sample | Strength of acid Bé. | Ratio of dust/acid | Temp. in cent. | % insol. P₂O₅ | % acidulation |
|---|---|---|---|---|---|
| (1) | 41 | 100/75 | 95 | 2.88 | 83.1 |
| (2) | 44½ | 100/75 | 95 | 3.74 | 79.8 |
| (3) | 47½ | 100/75 | 95 | 4.22 | 77.8 |
| (4) | 49 | 100/75 | 95 | 4.22 | 78 |
| (5) | 50 | 100/75 | 95 | 4.51 | 77.2 |
| (6) | 52 | 100/75 | 95 | 4.8 | 75.7 |

From this table it will be seen that at lower temperatures the 41° Bé. acid is a much more effective acidulating agent for phosphate rock than the acids which are now used in fertilizer production.

We have proved additionally that 41° Bé. acid is the most effective strength when the ratio of acid and rock is varied.

III. Same at different ratios of dust to acid 135°

| Sample | Strength of acid Bé. | Ratio of dust/acid | Temp. in cent. | % insol. P₂O₅ | % acidulation |
|---|---|---|---|---|---|
| (1) | 30 | 100/80 | 135 | 2.4 | 85.3 |
| (2) | 35 | 100/80 | 135 | 2.59 | 85.1 |
| (3) | 37 | 100/80 | 135 | 2.88 | 83.5 |
| (4) | 41 | 100/80 | 135 | 2.5 | 87.3 |
| (5) | 44½ | 100/80 | 135 | 2.59 | 86.5 |
| (6) | 47½ | 100/80 | 135 | 3.17 | 83.5 |
| (7) | 49 | 100/80 | 135 | 3.74 | 80.7 |
| (8) | 50 | 100/80 | 135 | 3.74 | 80.3 |
| (9) | 52 | 100/80 | 135 | 3.93 | 79.5 |

In this test the quantity of acid was increased and it was found, as shown, that the 41° Bé. acid gave better acidulation. We have found that this superiority of 41° Bé. acid obtains for other mixtures of rock and acid.

The foregoing experiments were conducted in the laboratory using small quantities of the materials. These results however were borne out and in fact the efficiency of the 41° acid accentuated by commercial tests. In the following table is given the average results of these runs in a large autoclave such as is described in our copending application Serial No. 172,359, filed Mar. 3, 1927. For convenience the tables show the comparative results obtained by using 52° Bé. acid which may be said to represent the prior art process and the treatment with 41° Bé. acid.

IV. Average of three runs in plant or large autoclave

| Strength of acid Bé. | Approx. yield, tons | % moisture | Total % P₂O₅ | Insol. % P₂O₅ | Available % P₂O₅ | % acidulation |
|---|---|---|---|---|---|---|
| 41 | 4¼ | 6.12 | 20.13 | 1.92 | 18.23 | 90.5 |
| 52 | 4¼ | 4.2 | 20.93 | 3.16 | 17.77 | 85 |

It clearly appears that the 41° acid is by far the better acidulating agent and that there is less shrinkage in the product.

The experiments which have been indicated by the foregoing tables were all carried out under autoclave conditions, that is to say with exclusion of air and under moderate super-atmospheric pressure. We find, however, that in open den work 41° Bé. acid possesses all these advantages over other acid strengths. As will be seen from an inspection of the following table, when open air acidulations are employed the 41° Bé. acid gives higher acidulation.

V

| Sample | Strength of acid Bé. | Ratio of dust/acid | Temp. in cent.° | % insol. $P_2O_5$ | % acidulation |
|---|---|---|---|---|---|
| (1) | 52° | 100/75 | 75 | 6.14 | 69.4 |
| (2) | 50 | 100/75 | 75 | 6.24 | 68.5 |
| (3) | 49 | 100/75 | 75 | 6.14 | 69.2 |
| (4) | 47.5 | 100/75 | 75 | 5.66 | 70.9 |
| (5) | 44.5 | 100/75 | 75 | 5.09 | 73.2 |
| (6) | 41 | 100/75 | 75 | 4.03 | 77.6 |

Another advantage attending the use of 41° Bé. acid is the fact that acid of this strength has less action on the fluoride impurities. As has been explained hereinbefore not an inconsiderable amount of the original charge of normal strength acid is consumed in the reaction with rock impurities. In our process it appears that but little acid is used up by reaction with fluorides. The following table illustrates this point. In this table is shown a fluorin analysis of the products obtained from samples 2, 5 and 6 of preceding table. The percentages as ascertained by both the wet and dry method are given. While the actual percentage obtained by each test varies, each shows that when rock dust is treated with 41° Bé. acid less of the fluorin reacts than is the case with higher concentrations, which is tantamount to saying that the reactivity of 41° Bé. acid on the fluorides is less than stronger acids.

VI

| Sample | Strength of acid Bé. | Moisture | % fluorine wet basis | Present dry basis |
|---|---|---|---|---|
| (2) | 50 | 3.65 | 1.77 | 1.84 |
| (5) | 44.5 | 7.55 | 2.15 | 2.32 |
| (6) | 41 | 9.71 | 2.26 | 2.50 |

From our observations it appears that the more concentrated sulphuric acid reacts quite vigorously with the fluorides to form hydrogen fluoride. The hydrogen fluoride may then react with silicious impurities to form silicon tetrafluoride and hydrofluosilic acid. The silicon tetrafluoride comes off as a gas and hence the sulphuric acid consumed in its production represents actual loss of potential acidifying agent. The hydrofluosilic acid has a weak and almost inappreciable acidulating effect on the tricalcium phosphate. Since 41° Bé. acid is less reactive with fluorides than the more concentrated solutions, as is clearly shown by our experiments, less is consumed to form silicon tetrafluoride or other undesirable products and more of it is rendered available for acidulation of the insoluble phosphate.

The following table illustrates the advantages attending the use of 41° Bé. acid both in open den and autoclave work, as compared to the acid customarily employed, that is 52° Bé. sulphuric acid. The rock dust used in this experiment was Nauru rock, an exceptionally high grade natural phosphate.

Table VII

| Exp. No. | Material dust fluoride | C. C. acid | Bé. acid | How treated | Temp. C. | % moisture | % total $P_2O_5$ | % insol. $P_2O_5$ | % avail. $P_2O_5$ | Acidulation |
|---|---|---|---|---|---|---|---|---|---|---|
| 1 | 12 | None | 5.8 | 52 | Oven | 75° | 1.55 | 26.26 | 5.56 | 20.70 | 78.8 |
| 2 | 12 | None | 8.5 | 41 | Oven | 75° | 8.7 | 23.22 | 3.94 | 19.28 | 83 |
| 3 | 12 | None | 5.8 | 52 | (Sealed tube) | 130° | 0.9 | 26.26 | 5.52 | 20.74 | 79 |
| 4 | 12 | None | 8.5 | 41 | (Sealed tube) | 130° | 1.75 | 25.63 | 4.22 | 21.41 | 83.5 |
| 5 | 11.04 | 0.96 | 5.8 | 52 | Oven | 75° | 2.9 | 23.85 | 3.90 | 19.95 | 83.6 |
| 6 | 11.04 | 0.96 | 8.5 | 41 | Oven | 75° | 13.06 | 20.93 | 2.60 | 18.33 | 87.6 |
| 7 | 11.04 | 0.96 | 5.8 | 52 | (Sealed tube) | 130° | 1.05 | 23.85 | 3.65 | 20.20 | 84.7 |
| 8 | 11.04 | 0.96 | 8.5 | 41 | (Sealed tube) | 130° | 3.15 | 23.60 | 2.35 | 21.25 | 90 |

The first four runs show the increased availability and acidulations obtained with 41° Bé. acid both in open air work and in sealed tubes. The last four runs show that 41° Bé. acid is likewise advantageous when a rock is employed which has an appreciable fluoride content.

We may carry out commercial operations by either of these two methods. In using a den process, comminuted phosphate rock is thoroughly mixed with sulphuric acid of approximately 41° Bé. in the usual type of apparatus. From here it may be discharged to a den or chamber to allow the mass to react further. Due to the fact that the product has a relatively high water content, it is preferable to transfer the den product to a mechanical dryer. In this apparatus the moisture content may be reduced to any desired degree. Depending upon the degree of dryness the material from the dryer may be transferred to the curing shed, or if the water content has been sufficiently reduced it may be immediately ground and bagged. It is to be understood that the product may be dusted with ground phosphate rock to absorb any free acid and to increase the percentage of available $P_2O_5$. It will be appreciated however that due to the effective utilization of the reagent there is much less free acid in the product than is usually the case.

As has been indicated, this process may be carried out most advantageously by the method described in our copending application Serial No. 179,706 filed March 30, 1927. As is therein described, the ground rock and acid may be admitted to the horizontal rotary autoclave either under gravity or applied pressure and mixed therein. If desired the ingredients may first be given a preliminary mixing and thereafter admitted to the autoclave, but as this involves the use of additional machinery without any commensurate benefits we prefer to carry out the mixing operation within the autoclave. In the preferred process this is accomplished by rotating the autoclave. As described in the application referred to, the temperature or pressure, or both the temperature and pressure, may be so controlled as to retain the mass in a mixable condition for any determinate period of time. Due to the penetrating powers of the 41° Bé. acid and the protracted period during which the mass is kept in a liquid state a thorough mixing of the ingredients is obtained. After the mixing of the ingredients has been consummated the temperature may be increased and the pressure released, in accordance with the principles set forth in the application referred to, to permit those reactions to proceed which will eventuate in the final desired products.

When the insoluble phosphate has been converted to an available form, the product may be crystallized and dried within the autoclave in accordance with the disclosure in our copending application. The treatment in an autoclave is particularly advantageous for the present method because of the ease and completeness with which the desiccation of the product may be carried out.

While two methods of preparing phosphate fertilizer have been indicated it is to be understood that these are merely suggestive. We consider our invention to reside broadly in the concept of acidulating phosphatic material with sulphuric acid which is less concentrated than the usual acid employed, that is to say, chamber acid. While we have dwelt upon the fact that 41° Bé. acid is the optimum acid strength, it will be apparent from the tables, for instance Tables I and III, that concentrations from 40° Bé. to 44° Bé. will have greater acidulating powers than the chamber acids, i. e., 50° Bé.

It will now be apparent that by utilizing the principles of our invention phosphate fertilizer may be made much cheaper than heretofore. In addition to economizing in production cost, we can produce from any given raw material a product which has a higher availability than the products heretofore manufactured from a sulphuric acid treatment.

We claim:

1. A process of manufacturing fertilizer comprising acidulating ground phosphatic material with 41° Bé. sulphuric acid in a zone in which pressures may be retained and allowing the ingredients to react therein at elevated pressures.

2. A process of manufacturing superphosphate comprising mixing ground phosphatic material with substantially 41° Bé. sulphuric acid, admitting the mixture to a zone in which pressures may be retained and allowing the ingredients to react therein at elevated pressures to form available phosphates.

3. A process of manufacturing superphosphate comprising mixing ground phosphatic material and substantially 41° Bé. sulphuric acid in a zone in which superatmospheric pressures are maintained, allowing the ingredients to react therein and subsequently drying the product.

4. A process of manufacturing superphosphate comprising treating ground phosphate rock with substantially 41° Bé. sulphuric acid in a zone in which superatmospheric pressures are maintained, allowing the ingredients to react therein to form available phosphates and crystallizing and drying the product within said zone.

5. A process of manufacturing phosphatic fertilizer comprising mixing ground phosphatic material and 41° Bé. sulphuric acid, passing the substantially unset mixture to a confined space, agitating and digesting the mass under controlled superatmospheric pressure and temperature and drying the product.

6. A process of preparing phosphatic fertilizer comprising mixing unavailable phosphatic material with 41° Bé. sulphuric acid, which will react therewith to form available phosphates, passing the substantially unset mixture to a zone in which controlled pressures may be maintained and agitating and digesting the mixture under superatmospheric temperature and pressure.

7. A process of manufacturing superphosphate, comprising digesting a substantially unset mixture of unavailable phosphate rock dust and 41° Bé. sulphuric acid in a confined space under superatmospheric pressure and temperature, mechanically agitating the mass and retaining it in the space for a period of time sufficient to effect substantial conversion of the unavailable phosphate to available forms.

8. A process of manufacturing superphosphate comprising mixing ground phosphate rock and 41° Bé. sulphuric acid, passing the substantially unset mixture to a confined space, agitating and digesting the mixture in said space under superatmospheric pressure and temperature for a period of time sufficient to effect a substantial conversion of the unavailable phosphate to available forms and then drying the solid products of conversion.

9. A process of manufacturing phosphate fertilizers comprising mixing ground phosphate rock and 41° Bé. sulphuric acid, digesting the mixture, while mechanically agitating it in a confined space under autogenous superatmospheric pressure and applied superatmospheric temperature for a period of time sufficient to effect a substantial conversion of the unavailable phosphates to available phosphates and drying the conversion products.

In testimony whereof we affix our signatures.

EDWARD H. WIGHT.
WILLIAM H. WAGGAMAN.
BEVERLY OBER.